United States Patent
Dötsch et al.

(10) Patent No.: US 11,099,053 B2
(45) Date of Patent: Aug. 24, 2021

(54) FAIL-SAFE LIMIT LEVEL SWITCH

(71) Applicant: Endress+Hauser SE+Co. KG, Maulburg (DE)

(72) Inventors: Michael Dötsch, Rickenbach (DE); Max Jehle, Wehr (DE); Izabella Sandor, Schopfheim (DE); Armin Wernet, Rheinfelden (DE)

(73) Assignee: Endress+HauserSE+Co. KG, Maulburg (DE)

( * ) Notice: Subject to any disclaimer, the term of this patent is extended or adjusted under 35 U.S.C. 154(b) by 48 days.

(21) Appl. No.: 16/468,562

(22) PCT Filed: Oct. 30, 2017

(86) PCT No.: PCT/EP2017/077762
§ 371 (c)(1),
(2) Date: Jun. 11, 2019

(87) PCT Pub. No.: WO2018/108377
PCT Pub. Date: Jun. 21, 2018

(65) Prior Publication Data
US 2019/0331519 A1    Oct. 31, 2019

(30) Foreign Application Priority Data
Dec. 14, 2016   (DE) .................. 10 2016 124 364.7

(51) Int. Cl.
*G01F 23/296* (2006.01)

(52) U.S. Cl.
CPC ............................... *G01F 23/2967* (2013.01)

(58) Field of Classification Search
CPC .. G01F 23/2962; G01F 23/284; G01F 23/296; G01F 23/2961; G01F 23/2967;
(Continued)

(56) References Cited

U.S. PATENT DOCUMENTS

| 9,122,281 | B1 | 9/2015 | Merton | |
|---|---|---|---|---|
| 2008/0229819 | A1 | 9/2008 | Maylben et al. | |
| 2010/0162811 | A1* | 7/2010 | Malinovskiy | G01F 23/2962 73/290 V |
| 2012/0265486 | A1* | 10/2012 | Klofer | G01F 23/2962 702/166 |

(Continued)

FOREIGN PATENT DOCUMENTS

| CN | 101400973 A | 4/2009 |
|---|---|---|
| CN | 102203570 A | 9/2011 |

(Continued)

*Primary Examiner* — Andre J Allen
(74) *Attorney, Agent, or Firm* — Mark A. Logan; Endress+Hauser (USA) Holding Inc.

(57) ABSTRACT

Disclosed is an apparatus for determining and/or monitoring a predetermined fill level of a medium in a containment. The apparatus includes a sensor unit and an electronics unit. The electronics unit includes a limiting unit embodied to limit an electrical current or voltage in at least one portion of the electronics unit, a switching unit embodied to control a process switch, and a signal transformation unit embodied to transform a dynamic, electrical input signal into a static, electrical output signal. The static output signal flows through at least one component of the electronics unit. Furthermore, the electronics unit is embodied to supply the sensor unit with an excitation signal, to receive from the sensor unit a received signal, to determine and/or to monitor whether the predetermined fill level has been reached, and to produce a control signal.

12 Claims, 2 Drawing Sheets

(58) Field of Classification Search
CPC ............ G01F 25/0061; G01F 23/2968; G01F 23/2965; G01F 23/2966; G01F 23/0061; G01F 23/0069; G01F 23/28; G01F 23/0007; G01F 23/0076; G01F 23/00; G01F 23/0046; G01F 23/22; G01F 23/26; G01F 22/00; G01F 23/0015; G01F 23/241; G01F 23/261; G01F 23/263; G01F 23/268; G01F 23/64; G01F 1/74; G01F 23/0053; G01F 23/20; G01F 23/265; G01F 23/266; G01F 23/282; G01F 23/2845; G01F 23/292; G01F 23/2921; G01F 23/2963; G01F 23/30; G01F 23/303; G01F 23/363; G01F 25/0007; G01F 25/0076

See application file for complete search history.

(56) References Cited

U.S. PATENT DOCUMENTS

| | | | |
|---|---|---|---|
| 2017/0205269 A1* | 7/2017 | Gerding | G01S 15/34 |
| 2019/0272495 A1* | 9/2019 | Moeller | G01F 23/296 |
| 2020/0209046 A1* | 7/2020 | Muller | G01F 23/0061 |

FOREIGN PATENT DOCUMENTS

| | | |
|---|---|---|
| CN | 202720021 U | 2/2013 |
| CN | 103038412 A | 4/2013 |
| CN | 203732125 U | 7/2014 |
| DE | 4412386 A1 | 10/1995 |
| DE | 29618256 U1 | 1/1997 |
| DE | 102008043412 A1 | 5/2010 |

* cited by examiner

FAIL-SAFE LIMIT LEVEL SWITCH

CROSS-REFERENCE TO RELATED APPLICATIONS

The present application is related to and claims the priority benefit of German Patent Application No. 10 2016 124 364.7, filed on Dec. 14, 2016 and International Patent Application No. PCT/EP2017/0777762, filed on Oct. 30, 2017, the entire contents of which are incorporated herein by reference.

TECHNICAL FIELD

The present invention relates to an apparatus for determining and/or monitoring at least one predetermined fill level of a medium in a containment, wherein the apparatus at least includes a sensor unit and an electronics unit operable by means of a dynamic, electrical signal. In the context of the present invention, the terminology, containment, refers to all apparatuses known to those skilled in the art, which are embodied to collect and/or to convey a medium, examples being containers and pipelines. The terminology, dynamic, electrical signal, refers in the case of the present invention to an electrical signal changeable as a function of time, for example, an alternating signal in the form of an alternating current or an alternating voltage, or a pulse width modulated signal (PWM).

BACKGROUND

Limit level switches in process and/or automation technology can be embodied, for example, as vibronic sensors having at least one mechanically oscillatable unit or as capacitive and/or conductive sensors. The basic principles and different embodiments are known from a large number of publications. Corresponding field devices are manufactured by the applicant in great variety and in the case of vibronic fill-level measuring devices are sold, for example, under the mark, LIQUIPHANT and/or SOLIPHANT, and in the case of capacitive and/or conductive measuring devices, for example, under the mark, LIQUIPOINT.

In the case of a vibronic limit level switch for liquids, for example, one distinguishes between whether the oscillatable unit is covered by the liquid or is freely oscillating. These two states, the free state and the covered state, are distinguished, in such case, for example, based on different resonance frequencies, thus, based on a frequency shift. The density and/or viscosity, in turn, can be ascertained with such a measuring device only in the case of an at least partial covering with the medium.

In the case of a conductive limit level switch, it is, in contrast, detected, whether an electrical contact is present between a probe electrode and the wall of a conductive container or a second electrode via a conductive medium. In the capacitive measuring method, on the other hand, fill level is ascertained from the capacitance of the capacitor formed by a probe electrode and the wall of the container or a second electrode. Depending on conductivity of the medium, either the medium or a probe insulation forms the dielectric of the capacitor.

In the case of safety-critical applications, such as, for example, use of a limit level switch in a container filled with a combustible liquid, the measuring device must satisfy different safety requirements as a function of the application. In this regard, for example, the so-called SIL standard (SIL stands for safety integrity level) of the standard, IEC61508, is used, which distinguishes between four different levels for specifying the requirement for the safety integrity of safety functions. The required safety level represents, in such case, in principle, a measure for the reliability of the system, or measuring device, as a function of a potential danger. Typically provided safety functions for assuring a certain level for the safety integrity are, for example, emergency turn off switches, or the turning off of overheated devices.

For setting a safety integrity level, for example, the failure behavior of individual modules is examined. Furthermore, the presence of redundant structures is determined, as well as the relationship between safe and unsafe, i.e. dangerous, failures distinguished. From such considerations, a total-failure rate can be determined, based on which the system, or measuring device, is assigned a certain safety integrity level.

SUMMARY

An object of the present invention is a measuring device, for which, in simple manner, it can be assured that the field device satisfies high safety requirements.

This object is achieved by an apparatus for determining and/or monitoring at least one predetermined fill level of a medium in a containment, comprising a sensor unit and an electronics unit operable by means of a dynamic, electrical signal. The electronics unit of the invention includes
- a limiting unit, which is embodied to limit an electrical current or an electrical voltage in at least one portion of the electronics unit at a predeterminable value,
- a switching unit, which is embodied to control by means of at least one electrical control signal a process switch element, especially a relay, having at least first and second switch states, and
- a signal transformation unit, which is embodied to transform a dynamic, electrical input signal into a static, electrical output signal, and wherein the signal transformation unit is arranged in such a manner that the static output signal flows through at least one component of the electronics unit.

Furthermore, the electronics unit is embodied
- to supply the sensor unit with an excitation signal, and to receive from the sensor unit a received signal,
- based on the received signal, to determine and/or to monitor, whether the predetermined fill level has been reached, and,
- as a function of whether the predetermined fill level has been reached, to produce at least one control signal.

The electronics unit of the invention advantageously assures that the failure safety of the measurement device is significantly increased. Because of the interaction of the limiting unit, the switching unit and the signal transformation unit, the number of possible unsafe, dangerous, failures is significantly reduced. Correspondingly, the measurement device of the invention fulfills high safety requirements, especially the SIL2 standard.

The electronics unit according to the invention is operated by means of a dynamic signal.

The signal transformation unit is especially designed to convert this dynamic signal, at least partially, thus, for at least one component of the electronics unit, preferably at least one component of the switching unit, into a static signal. The terminology, static signal, thus means an at least at times constant signal, for example, a direct voltage or a direct current. For the remaining components and/or modules, advantageously, a dynamic signal can be applied.

In an embodiment, the limiting unit comprises at least one voltage regulator, especially a series regulator or a switching regulator, a transistor, especially a field effect transistor, or an amplifier, especially an operational amplifier, or a Zener diode.

In an additional embodiment, the switching unit comprises at least one transistor, thyristor, controllable switch element and/or amplifier.

As regards the switching unit, it is advantageous that such comprises at least two equally constructed, series connected elements. For example, the two equally constructed elements are equally constructed thyristors. Because of the redundant embodiment of the two elements of the switching unit, advantageously, a doubled failure safety can be achieved.

In an embodiment, the apparatus includes a matching unit, which matching unit is embodied to match the at least one electrical control signal to an input signal of the process switch element. A signal matching is implemented in this embodiment, thus, by hardware components. Alternatively, a signal matching could be performed by means of a computing unit of the electronics unit. The latter option causes, however, an increased computing power compared with the first variant and can correspondingly be disadvantageous as regards the energy consumption of the apparatus.

Advantageously, the matching unit comprises at least one monoflop, transistor, and/or microcontroller.

In an especially preferred embodiment, the electronics unit, especially the signal transformation unit, is embodied to mask out a static signal portion of the dynamic signal, which static signal portion is caused by a failure or a malfunction of at least one component of the electronics unit. There occurs, thus, a decoupling of unintended static signal fractions. In this way, consequential failures due to the presence of an unwanted static signal fraction can be prevented.

Moreover, the combination of a dynamic signal for the electronics unit with the at least partial masking of unintended static signal fractions effects that both single failures of individual components of the electronics unit and also consequential failures in the signal transmission within the electronics unit do not lead to a dangerous state in the sense of the failure safety under SIL. When the at least one component is, for example, at least one component of the switching unit, for example, an unintended switching of the process switch element 9 can be prevented in each of the mentioned cases.

In an additional embodiment, the signal transformation unit is arranged in such a manner that the static output signal flows through at least one component of the switching unit. This embodiment is suited, thus, especially for a switching unit, for which a static signal is necessary. This is, for example, the case, when the switching unit comprises at least one thyristor.

In such case, it is advantageous that the signal transformation unit comprises at least one unit for electrical rectification, especially a diode, a capacitor and/or a resistor.

In an additional especially preferred embodiment, the electronics unit includes a computing unit, especially a microcontroller.

In such case, it is advantageous that, furthermore, a watchdog be provided, which is embodied to monitor the functioning of the computing unit and/or the supplying of the computing unit with electrical energy. This measure further increases the failure safety of the measurement device.

Furthermore, it is likewise advantageous that a voltage limiting unit be provided for limiting a supply voltage of the computing unit. Preferably, the voltage limiting unit comprises at least one series regulator, switching regulator, transistor, especially a field effect transistor, amplifier, especially an operational amplifier, or Zener diode.

BRIEF DESCRIPTION OF THE DRAWINGS

The present invention will now be explained in greater detail based on the appended drawing, the figures of which show as follows.

DETAILED DESCRIPTION

Figure 1:
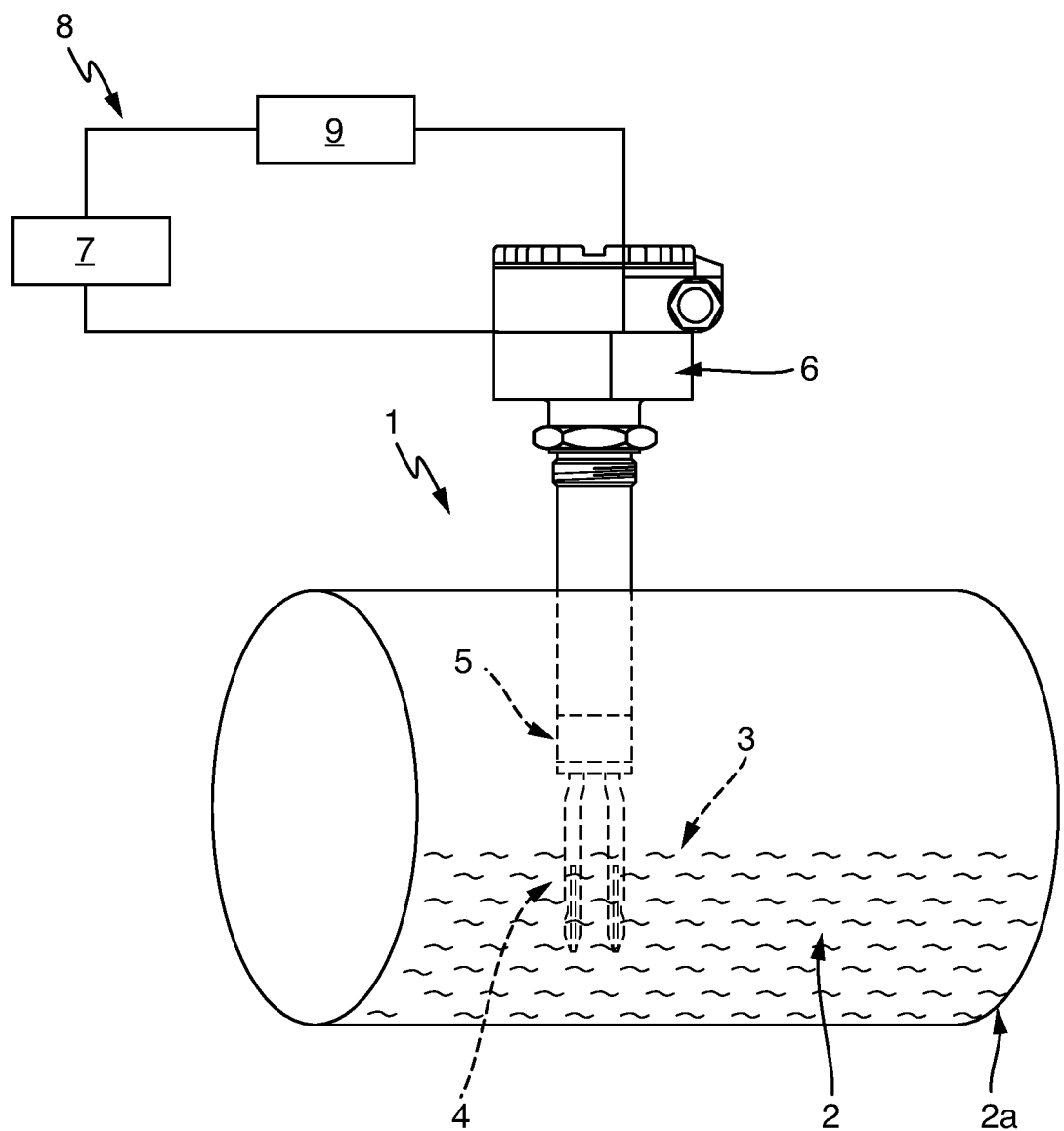
FIG. 1 shows a schematic view of a vibronic limit level switch of the state of the art.

Without intending to limit the general applicability of the invention, the following description concerns a field device 1 in the form of a vibronic sensor at least for determining and/or monitoring a predetermined fill level of a medium 2 in a container 2a. As evident from FIG. 1, the sensor unit 3 includes, in this case, a mechanically oscillatable unit 4 in the form of an oscillatory fork, which extends partially into the medium 2. Other known embodiments of a mechanically oscillatable unit 4 falling within the scope of the invention include, for example, a single tine or a membrane. The same holds for other measuring devices for monitoring a predetermined fill level.

The mechanically oscillatable unit 4 is excited, such that it executes mechanical oscillations, by means of the driving/receiving unit 5, which is supplied with the excitation signal, and which can be, for example, a four-quadrants drive or a bimorph drive. Furthermore, an electronics unit 6 is provided, by means of which the signal evaluation and/or— feeding occurs. The electronics unit serves, thus, for example, to excite the sensor unit 3 by means of a suitable excitation signal, such that it executes mechanical oscillations, and to receive a received signal from the sensor unit 3. In the case of a vibronic sensor 1, the excitation signal is determined based on the received signal, for example, in such a manner that a predeterminable phase shift is present between the excitation signal and the received signal. Based on the received signal, it can, moreover, be determined, whether the predetermined fill level has been reached.

The vibronic sensor 1 is supplied by means of an energy supply unit 7 with electrical energy, for example, in the form of an alternating signal, via the conductor loop 8, for example, a so-called two wire conductor loop. The electronics unit 6 then produces, as a function of whether the predetermined fill level has been reached, a control signal, by means of which a process switch element 9, for example, a relay, is controlled, i.e. for the example illustrated in FIG. 1, a switching event is triggered upon the reaching of the predetermined fill level.

Figure 2:
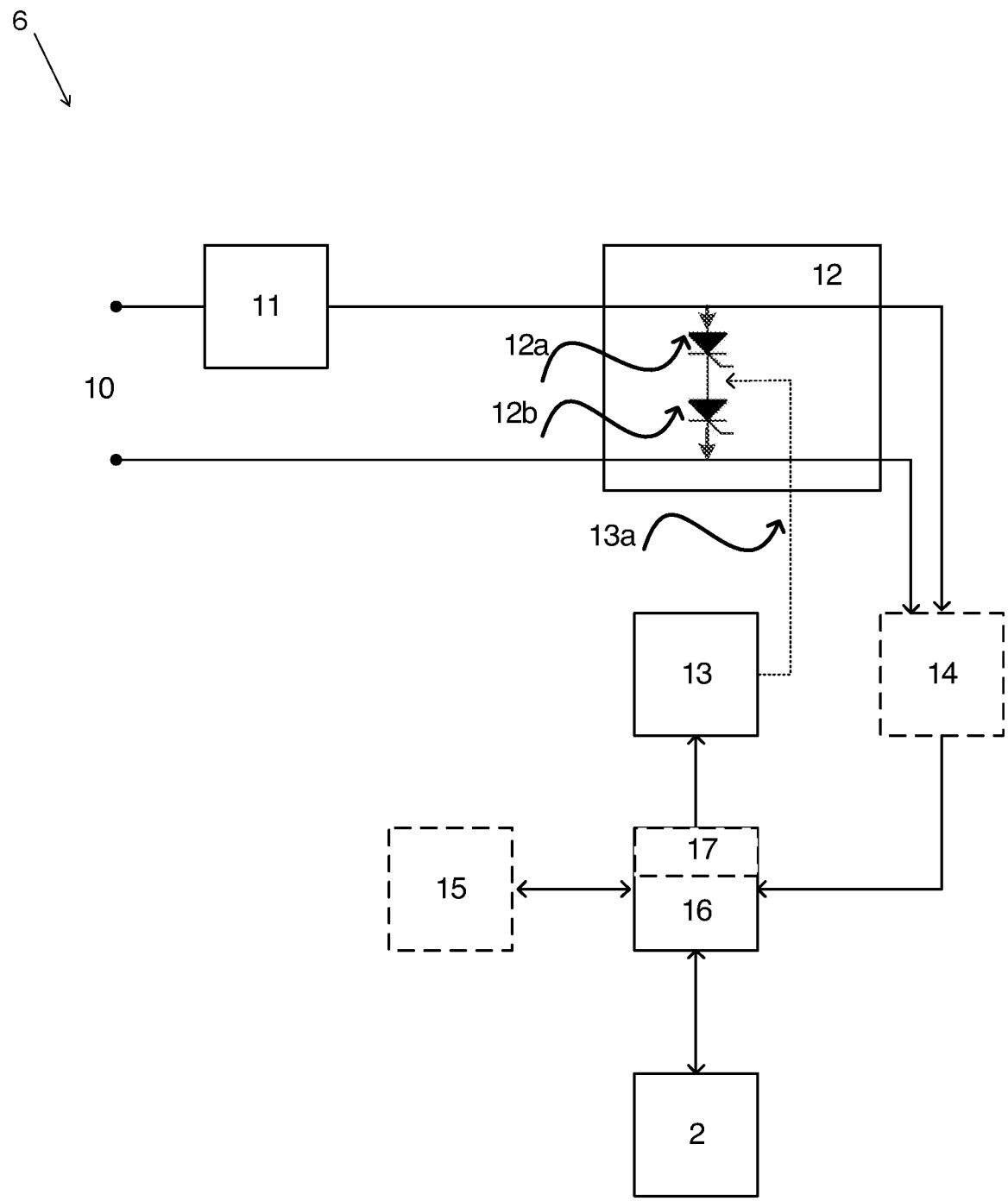
FIG. 2 shows a block diagram of an electronics unit of the invention.

FIG. 2 shows a block diagram of an electronics unit 6 of the invention. Via the contacting terminals 10, measurement device 1 and therewith especially the electronics unit 6 is connectable to the process loop 8. Electronics unit 6 includes a limiting unit 11 for limiting the electrical current or the electrical voltage to a predeterminable value. Moreover, a switching unit 12 is provided. Switching unit 12 switches the relay 9. To this end, and for assuring a doubled failure safety, the switching unit 12 in the illustrated embodiment includes two series connected thyristors 12a and 12b. Thyristors 12a, 12b represent in the case of the present invention a preferred embodiment for the switch element, since a thyristor is a comparatively robust component, for example, as regards maximum allowable electrical current or maximum allowable voltage. At the same time, advantageously, only a comparatively lower firing pulse is required for firing a thyristor. It is understood, however, that also other types of switching elements 12a, 12b can be used.

By means of the signal transformation unit 13, the dynamic signal is partially, here within the portion 13a, converted into a static signal. Furthermore, the signal transformation unit 13 is embodied to mask out an, in given cases present, unwanted, static signal portion of the dynamic signal, namely a static signal portion brought about by a malfunction, or a failure, of at least one component of the electronics unit 6. For the embodiment of FIG. 2, this leads to the fact that the two thyristors 12a, 12b are operated with the static output signal of the signal transformation unit 13. Furthermore, because unintended static signal fractions, brought about by a malfunction, or a failure, of at least one component of the electronics unit 6, are masked out, it is advantageously assured that none of the two thyristors 12a, 12b switches undesiredly, thus caused by a malfunction, or a failure, of at least one component of the electronics unit 6. The combination of a dynamic signal with the masking of unintended static signal fractions and the partial operation of the electronics unit by means of a static signal leads, thus, to the fact that both single failures of individual components of the electronics unit 6 and, thus, also consequential failures in the signal transmission within electronics unit lead to no dangerous state in the sense of the failure safety according to SIL. An unintended switching of the process switch element 9 can in each of the mentioned cases be prevented.

Further associated with the electronics unit 6 is a computing unit 16, here in the form of a microcontroller. By means of the microcontroller 16 there occurs, such as generally described with reference to FIG. 1, the signal evaluation and/or—feeding of the sensor unit 3. For increasing the functional safety of the measurement device 1, furthermore, a watchdog 15 is provided. This component is, however, optional for the functionality of the electronics unit of the invention. Other optional components include a matching unit 17 for matching the signal output by the microcontroller to the input signal of the process switch element 9, as well as a voltage limiting unit 14 for limiting a supply voltage of the microcontroller 16.

The invention claimed is:

1. An apparatus for determining and/or monitoring a predetermined fill level of a medium in a containment, comprising:
    a sensor unit; and
    an electronics unit operable by means of a dynamic, electrical signal, wherein the electronics unit includes:
        a limiting unit connected with an electrical input of the electronics unit and embodied to limit an electrical current or an electrical voltage in a portion of the electronics unit at a predeterminable value;
        a switching unit embodied to control via an electrical control signal a process switch element connectable to the electronics unit and having at least a first and a second switch state; and
        a signal transformation unit embodied to transform a dynamic, electrical input signal into a static, electrical output signal via which the electronics unit is partially operated, wherein the signal transformation unit is arranged such that the static, electrical output signal flows through a component of the switching unit,
    wherein the electronics unit is embodied to supply the sensor unit with an excitation signal, and to receive from the sensor unit a received signal, to determine and/or to monitor, based on the received signal, whether the predetermined fill level has been reached, and to produce the electrical control signal as a function of whether the predetermined fill level has been reached.

2. The apparatus as claimed in claim 1, wherein the limiting unit includes a voltage regulator, a transistor, an amplifier, or a Zener diode.

3. The apparatus as claimed in claim 1, wherein the switching unit includes at least one transistor, thyristor, controllable switch element, and/or amplifier.

4. The apparatus as claimed in claim 1, wherein the switching unit includes at least two equally constructed, series connected elements.

5. The apparatus as claimed in claim 1, further comprising:
    a matching unit embodied to match the at least one electrical control signal to an input signal of the process switch element.

6. The apparatus as claimed in claim 5, wherein the matching unit includes at least one monoflop, transistor, and/or microcontroller.

7. The apparatus as claimed in claim 1, wherein the signal transformation unit is embodied to mask out a static signal portion of the dynamic signal, which static signal portion is caused by a failure or a malfunction of at least one component of the electronics unit.

8. The apparatus as claimed in claim 1, wherein the signal transformation unit includes a unit for electrical rectification, wherein the unit for electrical rectification includes a diode, a capacitor, and/or a resistor.

9. The apparatus as claimed in claim 1, wherein the electronics unit includes a computing unit including a microcontroller.

10. The apparatus as claimed in claim 9, wherein the electronics unit further includes a watchdog embodied to monitor a functioning of the computing unit and/or a supplying of the computing unit with electrical energy.

11. The apparatus as claimed in claim 9, wherein the electronics unit further includes a voltage-limiting unit for limiting a supply voltage of the computing unit.

12. The apparatus as claimed in claim 11, wherein the voltage-limiting unit includes a series regulator, switching regulator, transistor, amplifier, or Zener diode.

* * * * *